United States Patent Office 2,844,642
Patented July 22, 1958

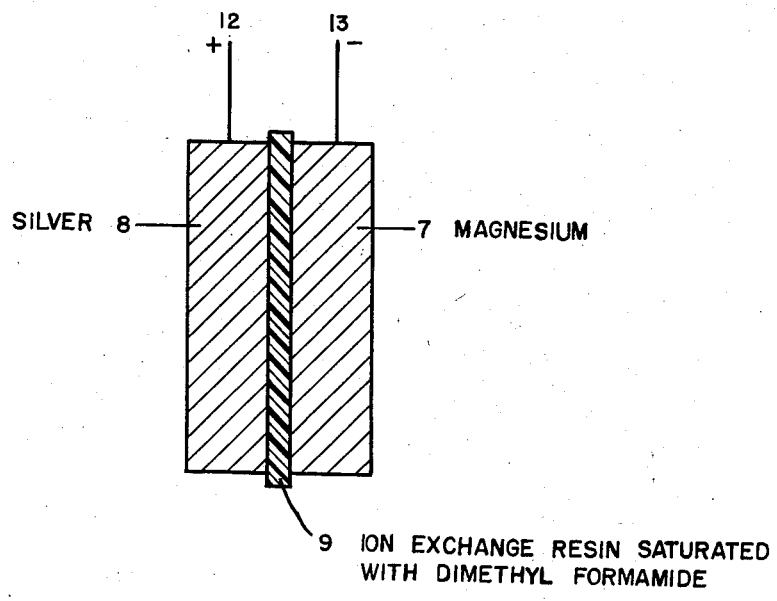

2,844,642

ION EXCHANGE RESIN BATTERY

Meyer Schwarz and Philip J. Franklin, Washington, D. C., assignors to the United States of America as represented by the Secretary of the Army Application January 11, 1957, Serial No. 633,801

1 Claim. (Cl. 136—153)

(Granted under Title 35, U. S. Code (1952), sec. 266)

The invention described herein may be manufactured and used by or for the Government for governmental purposes without the payment to us of any royalty thereon.

This invention relates to the type of low-drain electrical cell or battery in which the electrolyte comprises an ion exchange resin saturated with a suitable liquid.

The present invention provides improved batteries of the ion-exchange resin type, that operate satisfactorily over a much wider temperature range than previously known ion-exchange resin batteries. In batteries in accordance with the invention, the ion-exchange resin is treated with dimethyl formamide.

An ion-exchange resin battery is described in copending application Serial No. 550,221 filed November 30, 1955 by Willian J. Pauli. Unfortunately, despite their many advantages, known ion-exchange resin batteries have not been usable at low temperatures. A great need for ion-exchange batteries that would be usable at very low as well as high temperatures has been felt, but skilled persons have hitherto been unable to provide for this need. We have discovered that, by using dimethyl formamide to saturate the ion exchange resin, we are able to provide an improved ion-exchange resin battery that operates satisfactorily over the extreme temperature range of minus 78° F. to plus 307° F.

The principal object of the invention is to provide an ion-exchange resin battery capable of satisfactory operation at very high and very low temperatures.

The specific nature of the invention as well as other objects, uses and advantages thereof will clearly appear from the following description and from the accompanying drawing, in which:

The figure is a sectional view of a cell in accordance with the invention.

In the figure, the cell comprises a magnesium plate 7 and a silver plate 8, separated by a sheet 9 of cation exchange resin, preferably sulfonated polystyrene, saturated with dimethyl formamide as the activating solvent. Besides having a low pressure point, dimethyl formamide has a high dielectric constant and low viscosity at low as well as high temperatures.

When an electrical load is connected across the terminals 12 and 13 a current is generated by a process that involves a magnesium ion leaving plate 7 to displace a hydrogen ion of sheet 9. This hydrogen ion is then free to deposit on plate 7. This action is similar to that of other ion-exchange batteries.

For maximum shelf life the dimethyl formamide is preferably kept separate from the resin sheet 9 until the battery is to be activated.

It will be apparent that the embodiments shown are only exemplary and that various modifications can be made in construction and arrangement within the scope of the invention as defined in the appended claim.

We claim:

An ion exchange resin cell comprising: a magnesium first electrode; a silver second electrode; and a sheet of sulfonated polystyrene interposed between said electrodes, said sheet being saturated with dimethyl formamide.

References Cited in the file of this patent

UNITED STATES PATENTS 2,747,009   Kirkwood et al. _____ May 22, 1956